(12) United States Patent
Lin et al.

(10) Patent No.: US 12,469,968 B2
(45) Date of Patent: Nov. 11, 2025

(54) RECONFIGURABLE ANTENNA

(71) Applicant: National Taiwan University, Taipei (TW)

(72) Inventors: Yi-Cheng Lin, Taipei (TW); Ching-Mei Wang, Taipei (TW); Chang-Kai Lai, Taipei (TW)

(73) Assignee: NATIONAL TAIWAN UNIVERSITY, Taipei (TW)

( * ) Notice: Subject to any disclaimer, the term of this patent is extended or adjusted under 35 U.S.C. 154(b) by 229 days.

(21) Appl. No.: 18/223,885

(22) Filed: Jul. 19, 2023

(65) Prior Publication Data

US 2025/0030162 A1 Jan. 23, 2025

(51) Int. Cl.
*H01Q 3/46* (2006.01)
*H01Q 1/48* (2006.01)

(52) U.S. Cl.
CPC ............. *H01Q 3/46* (2013.01); *H01Q 1/48* (2013.01)

(58) Field of Classification Search
CPC ......... H01Q 3/46; H01Q 1/48; H01Q 15/0086
See application file for complete search history.

(56) References Cited

U.S. PATENT DOCUMENTS

| | | | | |
|---|---|---|---|---|
| 2,820,965 | A * | 1/1958 | Sichak | H01Q 25/001 343/756 |
| 4,691,206 | A * | 9/1987 | Shapter | H01Q 13/206 343/771 |
| 5,606,571 | A * | 2/1997 | Furuya | H01S 3/0975 372/64 |
| 6,927,729 | B2 * | 8/2005 | Legay | H01Q 15/0026 343/909 |
| 8,164,542 | B2 * | 4/2012 | Chantalat | H01Q 15/0073 343/909 |
| 11,581,640 | B2 * | 2/2023 | Eleftheriades | H01Q 19/06 |
| 11,670,867 | B2 * | 6/2023 | Boyarsky | H01Q 21/0037 343/731 |

(Continued)

FOREIGN PATENT DOCUMENTS

| | | | |
|---|---|---|---|
| CN | 115313061 A | 11/2022 | |
| CN | 116914437 A * | 10/2023 | ........... H01Q 15/002 |

(Continued)

*Primary Examiner* — Dameon E Levi
*Assistant Examiner* — Jordan E. DeWitt
(74) *Attorney, Agent, or Firm* — Birch, Stewart, Kolasch & Birch, LLP

(57) ABSTRACT

The present invention is a reconfigurable antenna, which includes a total reflection part, a partial reflection part, a partial transmission part, and a radiation part stacked in sequence. A resonant cavity is formed between the partial reflection part and the total reflection part. The radiation part is arranged in the resonant cavity. So that the electromagnetic wave radiated by the radiation part is reflected in the resonant cavity. The electromagnetic wave forms constructive interference during the reflection of the resonant cavity. The resonant cavity makes the electromagnetic wave form the same phase electromagnetic wave and radiation penetrating the reflection part. The partial transmission part is regulated to form beam reconstruction conditions, and the same-phase electromagnetic waves are formed into beams and radiated into space by the beam control conditions.

17 Claims, 9 Drawing Sheets

(56) References Cited

U.S. PATENT DOCUMENTS

| | | | | |
|---|---|---|---|---|
| 2001/0004129 A1* | 6/2001 | Tsukiyama | ............... | H01L 23/66 |
| | | | | 257/691 |
| 2008/0277681 A1* | 11/2008 | Xu | ....................... | H10H 20/814 |
| | | | | 257/E33.064 |
| 2011/0163930 A1* | 7/2011 | De Lustrac | ........ | H01Q 15/0066 |
| | | | | 343/777 |
| 2012/0162001 A1* | 6/2012 | Sim | .................... | G01R 29/0821 |
| | | | | 342/4 |
| 2013/0207859 A1* | 8/2013 | Legay | ................. | H01Q 15/244 |
| | | | | 343/756 |
| 2014/0266946 A1* | 9/2014 | Bily | ......................... | H01Q 3/22 |
| | | | | 343/771 |
| 2017/0201030 A1* | 7/2017 | Jang | ................... | H01Q 15/0086 |
| 2018/0048074 A1* | 2/2018 | Lilja | ..................... | H01Q 1/243 |
| 2018/0205134 A1* | 7/2018 | Khan | ..................... | H01Q 5/314 |
| 2019/0302225 A1* | 10/2019 | Kawaguchi | ............ | G01S 13/931 |
| 2020/0025619 A1* | 1/2020 | Almasri | ................. | G01J 5/046 |
| 2020/0295436 A1* | 9/2020 | Ueda | .................... | H01Q 21/065 |
| 2021/0005973 A1* | 1/2021 | Franklin | ............. | H01Q 9/0407 |
| 2021/0210866 A1* | 7/2021 | Boyarsky | ................ | H01Q 13/28 |
| 2023/0352849 A1* | 11/2023 | Boyarsky | ............... | H01Q 13/20 |
| 2024/0240990 A1* | 7/2024 | Généreux | ................ | G01J 5/022 |
| 2024/0258717 A1* | 8/2024 | Wu | .......................... | H01Q 1/44 |
| 2025/0007165 A1* | 1/2025 | Xing | .................... | H01Q 15/0013 |
| 2025/0030162 A1* | 1/2025 | Lin | .......................... | H01Q 1/48 |

FOREIGN PATENT DOCUMENTS

| | | | | |
|---|---|---|---|---|
| EP | 2 266 166 B1 | 11/2017 | | |
| TW | I420740 B | 12/2013 | | |
| WO | WO-2009115870 A1 * | 9/2009 | ......... | H01Q 15/0066 |

\* cited by examiner

RECONFIGURABLE ANTENNA

BACKGROUND OF THE INVENTION

Field of the Invention

The invention relates to an antenna, in particular, to a reconfigurable antenna.

Description of the Prior Art

A traditional antenna, taking Taiwan Patent No. 1420740 as an example (hereinafter referred to as "Previous Patent Application 1"), discloses an antenna module including a partial reflection cover plate, an antenna substrate, an antenna and a reflective pattern. The antenna is arranged on the antenna substrate. The reflective pattern is formed on the reflection cover plate, the reflective pattern is opposite to the antenna, and a reflection distance is formed between the reflection cover plate and the antenna substrate, wherein the reflective pattern provides a first reflection phase, and the antenna substrate provides a second reflection phase; the first reflection phase includes a first preset phase angle, the first preset phase angle is not 0°, and the first reflection phase is about $-(180°-\Delta)$; the second reflection phase includes a second preset phase angle, the second reflection phase is about $-(180°-\Delta 2)$; a length of a reflection distance is proportional to a preset phase angle sum $\Delta=\Delta 1+\Delta 2$, and the preset phase angle sum is between 0° and 90°, so as to realize the antenna module with high bandwidth, high gain and high directivity.

From the foregoing, it can be known that Previous Patent Application 1 can only radiate electromagnetic waves at the preset phase angle, and cannot adjust the preset phase angle; to change a beam direction of the antenna, the reflective pattern or an antenna base needs to be redesigned.

Based on the above problem of being unable to adjust the beam direction, improvements have been made to this problem, such as European Patent No. EP2266166B1 (hereinafter referred to as Previous Patent Application 2), which discloses an adjustable microwave antenna including a resonant cavity and a radiating element, wherein the radiating element is arranged in the resonant cavity for generating electromagnetic waves, and the resonant cavity is formed by a partial reflection surface and a total reflection surface, the partial reflection surface being provided with a transmit-receive unit array; the partial reflection surface includes at least an inductor array and a capacitor array formed by a reflection area pattern, the inductor array is separated from the capacitor array by a dielectric region, and a bias circuit is used to control transmittance and directivity of the transmit-receive unit array.

However, it can be known from FIG. 5a, FIG. 5a, FIGS. 6a, and 6b of Previous Patent Application 2 and corresponding descriptions that a central frequency of the antenna is changed by the different bias voltages given by the bias circuit, and the phase angle of the antenna is also changed, which limits the application of the antenna.

In summary, how to make the antenna adjust the beam direction of the electromagnetic wave with better flexibility and adjustability for quickly adapting to different communication scenarios and environmental changes to achieve better communication performance is an urgent problem to be solved at present.

SUMMARY OF THE INVENTION

In view of the problems in the prior art, an objective of the invention is to adjust a radiation beam direction of the antenna with a simple antenna structure, and cause a large change in the beam angle within an operating frequency range of the antenna.

According to the objective of the invention, a reconfigurable antenna is provided, including a partial reflection part, a total reflection part, a partial transmission part, and a radiation part, wherein the total reflection part is arranged on one side of the partial reflection part, and the partial transmission part is arranged on one side of the partial reflection part facing away from the total reflection part; a reflection coefficient of the partial reflection part is greater than a transmission coefficient thereof, and a transmission coefficient of the partial transmission part is greater than a reflection coefficient thereof. A resonant cavity is formed between the partial reflection part and the total reflection part, and an electromagnetic wave in the resonant cavity is reflected back and forth in the resonant cavity, during the reflection of the electromagnetic wave back and forth in the resonant cavity and when the electromagnetic wave meets a resonance condition to form a constructive interference, a phase angle of the electromagnetic wave tends to be consistent for radiation to penetrate the partial reflection part. The partial transmission part is regulated to form a beam reconstruction condition, wherein the electromagnetic wave of which the phase angle tends to be consistent is shaped according to the beam reconstruction condition to radiate into space. The radiation part is arranged in the resonant cavity, the radiation part radiating the electromagnetic wave.

In some embodiments, the total reflection part includes a first substrate, a first metastructure layer, and a grounded metal surface. The first metastructure layer is arranged on one side of the first substrate, and the grounded metal surface is arranged on one side of the first substrate facing away from the first metastructure layer.

In some embodiments, the first metastructure layer is a first metal conductor layer, and the first metal conductor layer is in a periodically changing pattern to totally reflect the electromagnetic wave.

In some embodiments, the radiation part includes a radiator, a transition structure and a connector, wherein the radiator is arranged between the first substrate and the partial reflection part; the transition structure is arranged on the first substrate and connected with the radiator; the connector is connected with the transition structure and the grounded metal surface, the connector being configured to receive a feeding source, such that the transition structure receives energy of the feeding source via the connector to radiate the electromagnetic wave from the radiator.

In some embodiments, the partial reflection part includes a second substrate, a second metastructure layer, and a third metastructure layer, wherein the second substrate is arranged at a position facing the first substrate; the second metastructure layer is arranged on one side of the second substrate facing the first substrate; the third metastructure layer is arranged on one side of the second substrate facing away from the first substrate; the second substrate, the second metastructure layer, and the third metastructure layer together form a first metainterface to realize the resonance condition.

In some embodiments, the second metastructure layer is a second metal conductor layer, the third metastructure layer is a third metal conductor layer, and the second metal conductor layer and the third metal conductor layer realize the resonant condition in a periodically changing pattern.

In some embodiments, the periodically changing pattern of the second metal conductor layer is the first metal grid, and the periodically changing pattern of the third metal conductor layer is a first metal block respectively arranged in each hollow position of the first metal grid.

In some embodiments, the periodically changing pattern of the third metal conductor layer is the first metal grid, and the periodically changing pattern of the second metal conductor layer is the first metal block respectively arranged in the first metal grid.

In some embodiments, the periodically changing pattern of the second metal conductor layer is a plurality of first metal stripes arranged vertically, and the periodically changing pattern of the third metal conductor layer is a plurality of second metal stripes arranged laterally;

the periodically changing pattern of the second metal conductor layer is a plurality of first metal stripes arranged laterally, and the periodically changing pattern of the third metal conductor layer is a plurality of second metal stripes arranged vertically.

In some embodiments, the partial transmission part includes a third substrate, a fourth metastructure layer, and a fifth metastructure layer, wherein the third substrate is arranged at a position facing the second substrate; the fourth metastructure layer is arranged on one side of the third substrate facing the second substrate; the fifth metastructure layer is arranged on one side of the third substrate facing away from the second substrate; the third substrate, the fourth metastructure layer, and the fifth metastructure layer together form a second metainterface such that the electromagnetic wave of which the phase angle tends to be consistent passing through the third substrate, the fourth metastructure layer, and the fifth metastructure layer realize to regulate the beam reconstruction condition with the same or different time delays.

In some embodiments, the fourth metastructure layer is a fourth metal conductor layer, the fifth metastructure layer is a fifth metal conductor layer, and the fourth metal conductor layer and the fifth metal conductor layer are in a periodically changing pattern; wherein a plurality of first adjusters of the fourth conductor metal layer and a plurality of second adjusters of the fifth conductor metal layer are adjusted to realize the beam reconstruction condition.

In some embodiments, the fourth metastructure layer is the fourth metal conductor layer, and the fourth metal conductor layer includes the periodically changing pattern as a second metal grid, and second metal blocks arranged respectively in each hollow position of the second metal grid; each of the second metal blocks is separated from the second metal grid surrounding thereto by a third distance, at least one of a plurality of first adjusters are arranged between each of the second metal blocks and the second metal grid surrounding thereto respectively, and the at least one of the plurality of first adjusters connected between each of the second metal blocks and the second metal grid surrounding thereto respectively forms a first reconstruction part; each of the first reconstruction parts forms the same or different time delays with the corresponding positions of the corresponding third substrate and the fifth metal conductor layer, so as to realize the beam reconstruction condition.

In some embodiments, the fifth metal conductor layer includes the periodically changing pattern as a third metal grid, and third metal blocks arranged in each hollow position of the third metal grid; the third metal block is separated from the third metal grid surrounding thereto by a fourth distance, at least one of a plurality of second adjusters is respectively arranged between each of the third metal blocks and the third metal grid surrounding thereto, and the at least one of the plurality of second adjusters connected between each of the third metal blocks and the third metal grid surrounding thereto respectively forms a second reconstruction part.

In summary, in the invention, the shift of the operating frequency of the antenna is small, and the beam direction of the antenna radiation may be adjusted; or, under the premise that the operating frequency band of the antenna remains unchanged, a radiation of the antenna may be adjusted to a single beam direction or multiple beam directions, so as to solve the problem that the antenna may operate at a fixed operating frequency and change the beam direction with the varying bias voltages.

DESCRIPTION OF THE PREFERRED EMBODIMENTS

Figure 1:
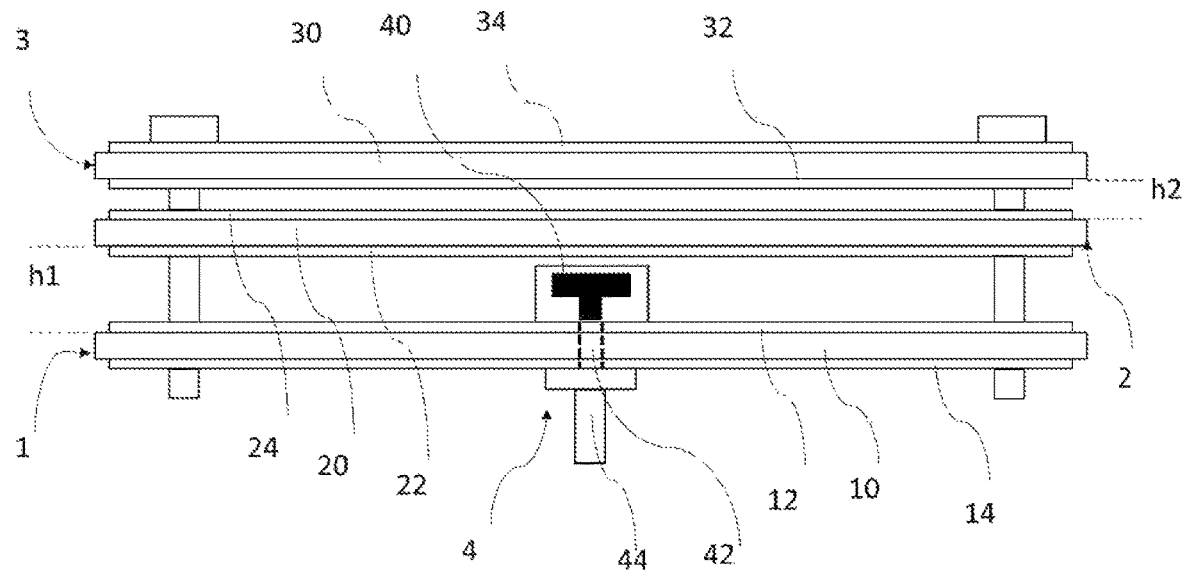
FIG. 1 is a diagram of an architecture according to the present invention.

Embodiments of the invention will be further explained with the help of the related drawings below. Wherever possible, in the drawings and the description, the same reference numbers refer to the same or similar components. In the drawings, shapes and thicknesses may be exaggerated for simplicity and convenience. It should be understood that the elements not particularly shown in the drawings or described in the specification have forms known to those skilled in the art. Those skilled in the art can make various changes and modifications based on the content of the invention.

The invention is a reconfigurable antenna, which, with reference to FIG. 1, includes a total reflection part 1, a partial reflection part 2, a partial transmission part 3, and a radiation part 4, wherein the total reflection part 1 is arranged on one side facing the partial reflection part 2, and the partial transmission part 3 is arranged on one side of the partial reflection part 2 facing away from the total reflection part 1; the total reflection part 1 is separated from the partial reflection part 2 by a first distance h1, and the partial reflection part 2 is separated from the partial transmission part 3 by a first distance h2. A reflection coefficient of the partial reflection part 2 is greater than a transmission coefficient thereof, and a transmission coefficient of the partial transmission part 3 is greater than a reflection coefficient thereof. A resonant cavity is formed between the partial reflection part 2 and the total reflection part 1. The radiation part 4 is arranged in the resonant cavity, and radiates electromagnetic waves into the resonant cavity. The partial reflection part 2 reflects the electromagnetic wave back and forth in the resonant cavity, and the partial reflection part 2 forms constructive interference during the back and forth reflection of the electromagnetic wave; the electromagnetic wave of which a phase angle tends to be consistent radiates and penetrates the partial reflection part 2. The partial transmission part 3 is regulated to form a beam reconstruction condition, wherein the electromagnetic wave of which the phase angle tends to be consistent is shaped according to the beam reconstruction condition to radiate into space.

In the invention, with reference to FIG. 2, a relationship between a height of the first distance h1 separating the total reflection part 1 from the partial reflection part 2 and the constructive interference formed by the back-and-forth reflection in the resonant cavity is as follows:

$$\varphi_1 + \varphi_2 + 2kh_1 = 2\pi N$$

$$\Gamma_1 = |\Gamma_2|e^{j\varphi_1}$$

$$\Gamma_2 = |\Gamma_2|e^{j\varphi_2}$$

wherein $\Gamma_1$ is the reflection coefficient of the partial reflection part 2, and $\phi_1$ is the reflection phase angle of the partial reflection part 2; in other words, $\Gamma_2$ is the reflection coefficient of the total reflection part 1, and $\Phi_2$ is the reflection phase angle of the total reflection part 1, 2 $\pi$=360°, N is an integer, k is $2\pi/\lambda$, and $\lambda$ is the wavelength.

Figure 2:
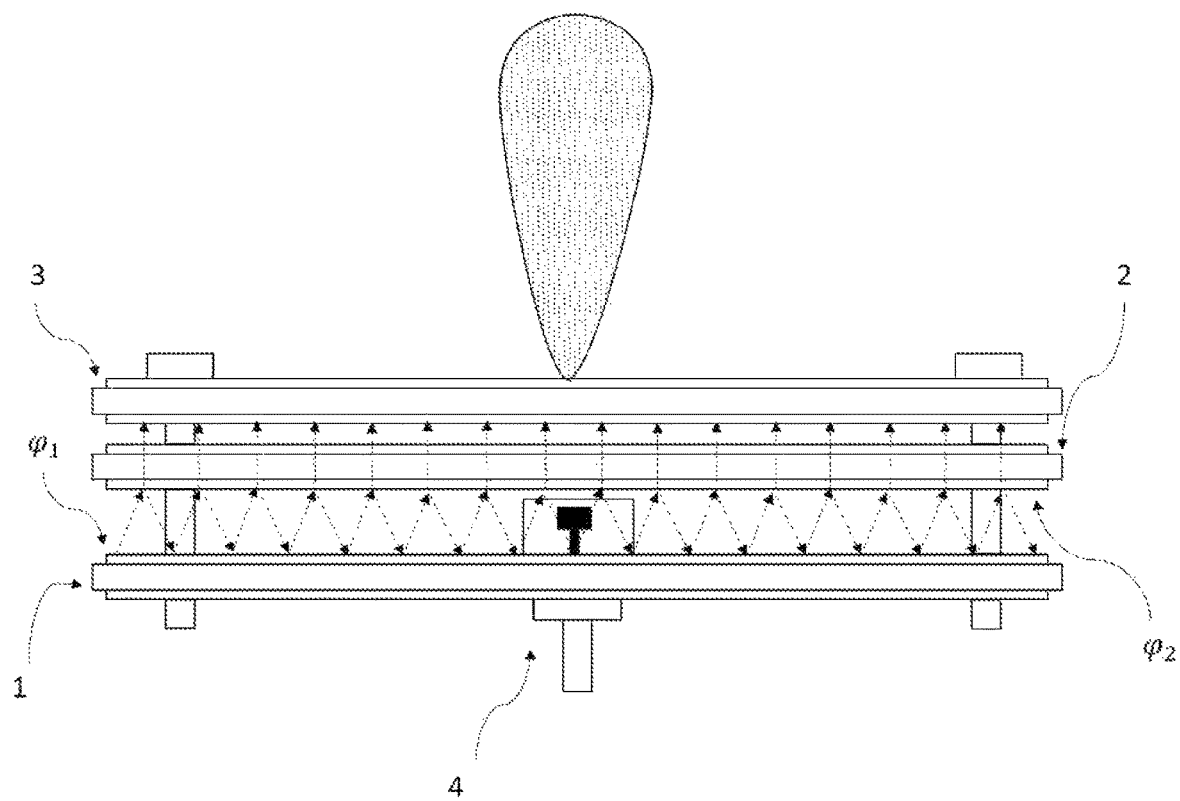
FIG. 2 is a diagram of reflection and transmission of an electromagnetic wave in a beam reconstruction device according to the present invention.
Figure 3:
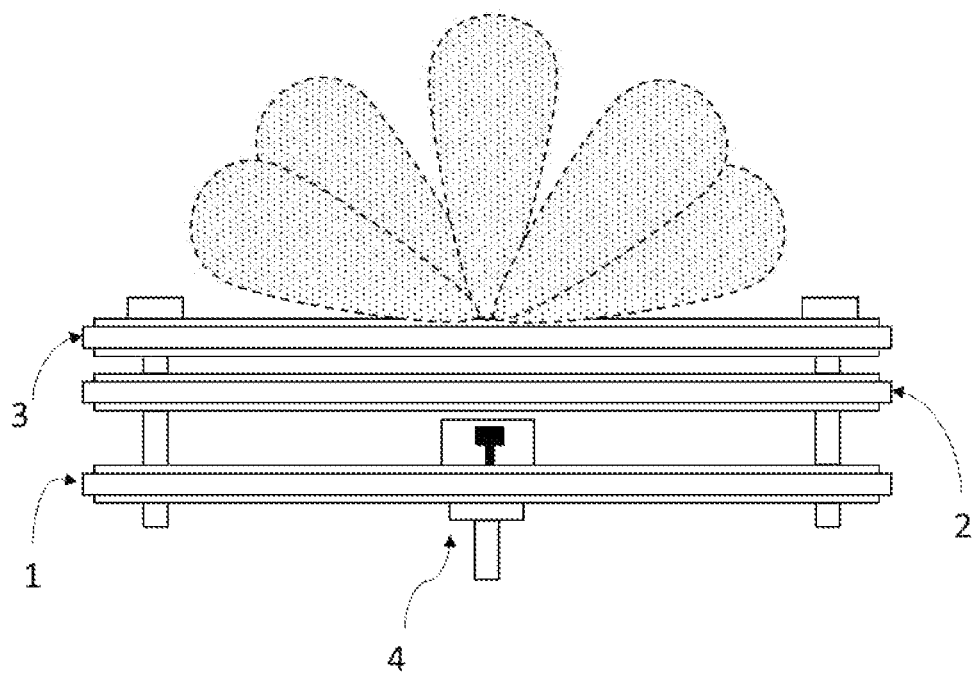
FIG. 3 is a diagram of the electromagnetic wave reconfigured into different beam directions in the beam reconstruction device according to the present invention.

In the invention, with further reference to FIG. 2, a beam reconstruction condition generated by the partial transmission part 3 is to adjust the electromagnetic wave of which the phase angle tends to be consistent to maintain or change a phase, such that the electromagnetic wave of which the phase angle tends to be consistent that penetrates the partial transmission part 3 is changed in phase, and then aggregated into a beam in a certain direction in the air to be radiated out. Further, with reference to FIG. 3, when the beam reconstruction condition generated by the partial transmission part 3 adjusts the electromagnetic wave of which the phase angle tends to be consistent under different changes in phase, such that the electromagnetic waves of which the phase angle tends to be consistent that penetrates the partial transmission part 3 have different changes, so as to aggregate into beams in different directions to be radiated out in the air.

Figure 4:
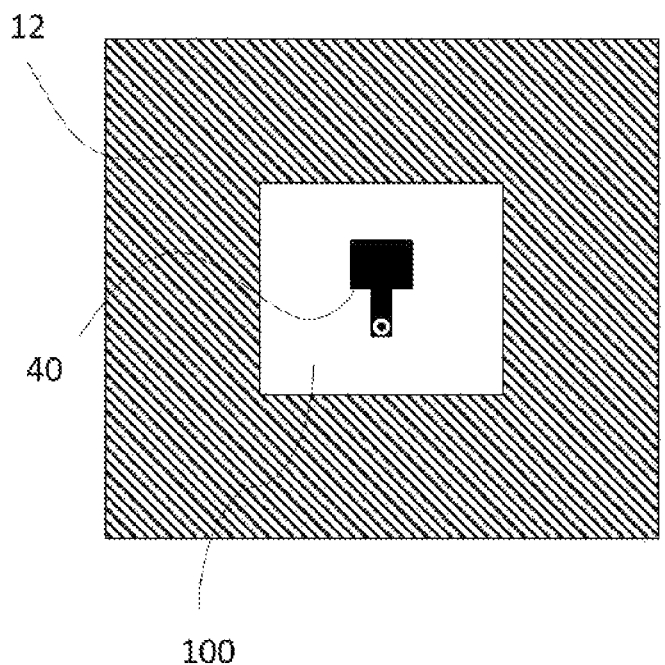
FIG. 4 is a diagram of one embodiment of a total reflection part of the present invention facing away from one side of the partial reflection part.
Figure 5:
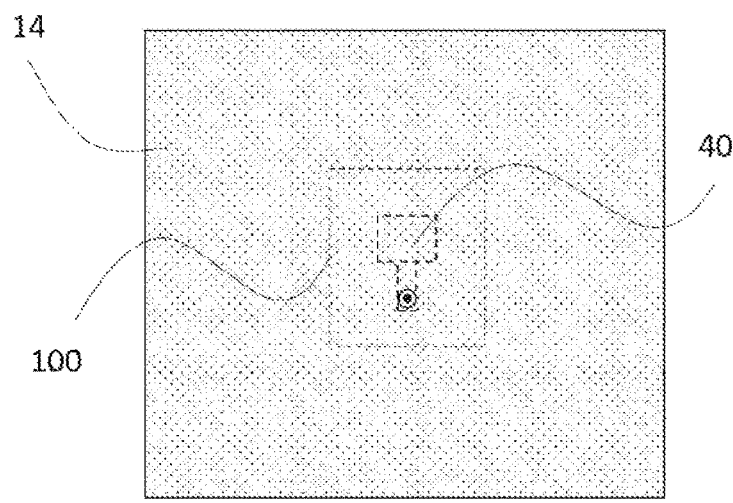
FIG. 5 is a diagram of one side of the total reflection part in FIG. 4 facing the partial reflection part.

In the invention, with reference to FIG. 1 and FIGS. 4 to 5, the total reflection part 1 includes a first substrate 10, a first metastructure layer 12, and a grounded metal surface 14, wherein the first metastructure layer 12 is arranged on one side of the first substrate 10, and the first substrate 10 faces away from one side of the first metastructure layer 12. Also, the first metastructure layer 12 is a first metal conductor layer, and the first metal conductor layer is in a periodically changing pattern to totally reflect the electromagnetic wave.

In the invention, with reference to FIG. 1, the radiation part 4 includes a radiator 40, a transition structure 42, and a connector 44, wherein the radiator 40 is arranged between the first substrate 10 and the partial reflection part 2; the transition structure 42 is arranged on the first substrate 10 and connected with the radiator 40; the connector 44 is connected with the transition structure 42 and the grounded metal surface 14, the connector being configured to receive a feeding source, such that the transition structure 42 receives an energy of the feeding source via the connector 44 to radiate the electromagnetic wave from the radiator 40. The transition structure 42 is designed as a single-branch or multi-branch metal microstrip wire according to the matching requirements of the radiator 40, or a metal via penetrating through the first substrate 10 and connected to the radiator 40; the connector 44 may be a radio frequency connector, e.g., a coaxial RF connectors, and further a SubMiniature version A Connector or End Launch Connectors and so on.

Figure 6:
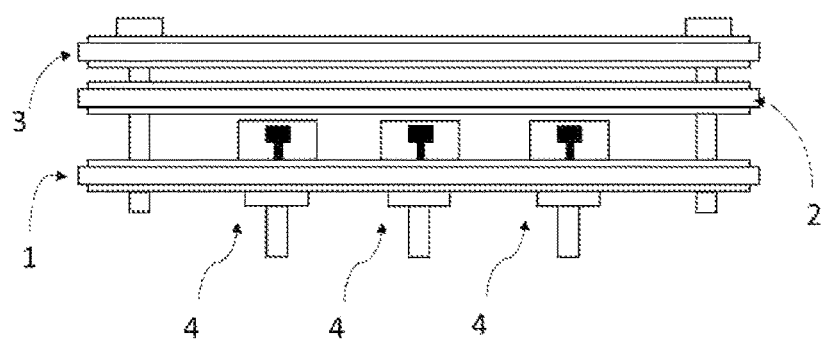
FIG. 6 is a diagram of an architecture with a plurality of radiation parts according to the present invention.
Figure 7:
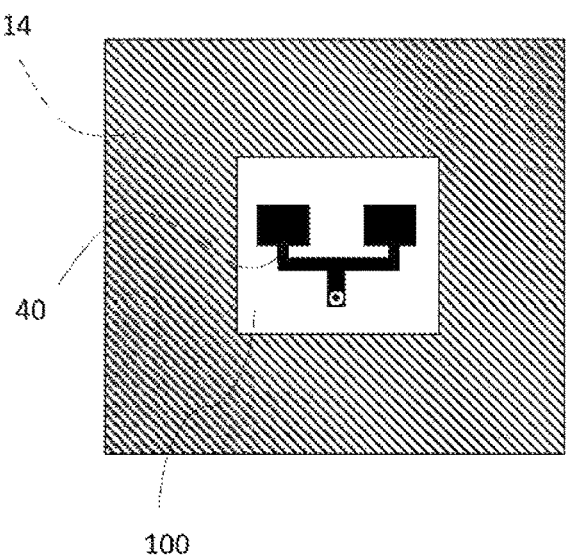
FIG. 7 is a diagram of an architecture wherein the total reflection part is provided with the radiator arranged in an array according to the present invention.

In addition, with reference to FIG. 1 and FIGS. 4 to 5, part or all of one side of the total reflection part 1 facing the partial reflection part 2 is the first metastructure layer 12, and the radiator 40 may be perpendicular to the total reflection part 1, or the radiator 40 may have an oblique angle with respect to the total reflection part 1, or the number of radiators 40 may be multiple (as shown in FIG. 6). With reference to FIGS. 5 and 7, the first substrate 10 is provided with a clearance area 100, the first metal conductor layer is arranged around the clearance area 100, and the radiator 40 in the clearance area 100 is in a single pattern or an array pattern.

Figure 8:
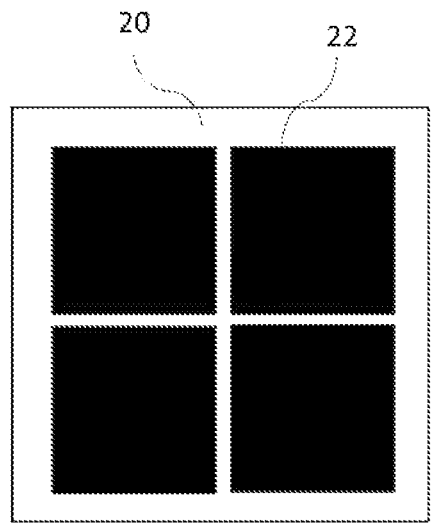
FIG. 8 is a diagram of one embodiment of a partial reflection part of the present invention facing one side of the total reflection part.
Figure 9:
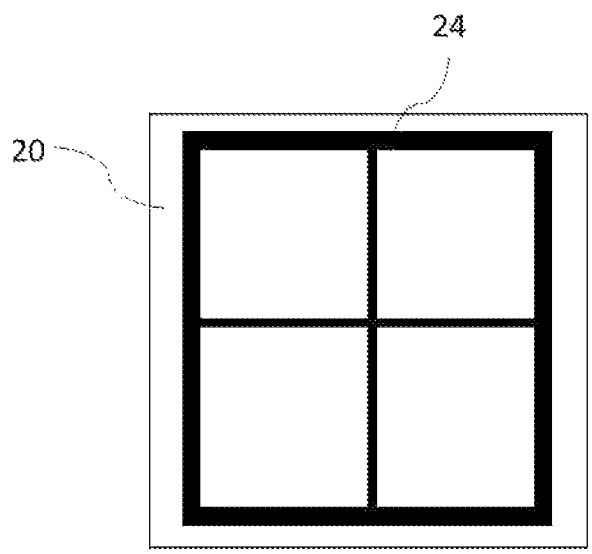
FIG. 9 is a diagram of one side of the partial reflection part in FIG. 8 facing the partial transmission part.

In the invention, with reference to FIGS. 8 and 9, the partial reflection part 2 includes a second substrate 20, a second metastructure layer 22, and a third metastructure layer 24, wherein the second substrate 20 is arranged at a position facing the first substrate 10; the second metastructure layer 22 is arranged on one side of the second substrate 20 facing the first substrate 10; the third metastructure layer 24 is arranged on one side of the second substrate 20 facing away from the first substrate 10; the second substrate 20, the second metastructure layer 22, and the third metastructure layer 24 together form a first metainterface to realize the resonance condition. The second metastructure layer 22 is a second metal conductor layer, the second metastructure layer 22 is a third metal conductor layer, and the second metal conductor layer and the third metal conductor layer realize the resonant condition in a periodically changing pattern.

Figure 10:
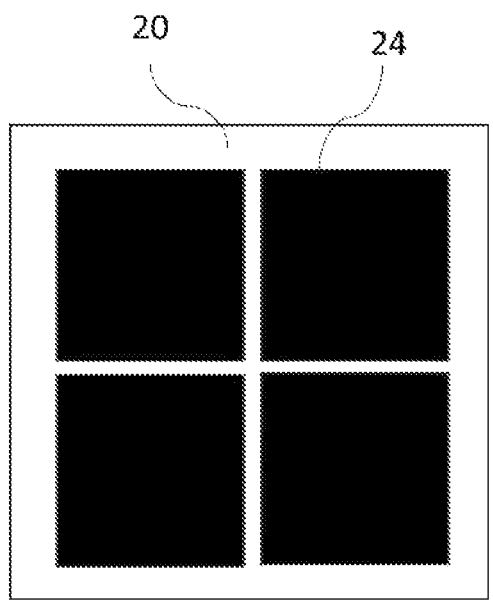
FIG. 10 is a diagram of another embodiment of a partial reflection part of the present invention facing one side of the total reflection part.
Figure 11:
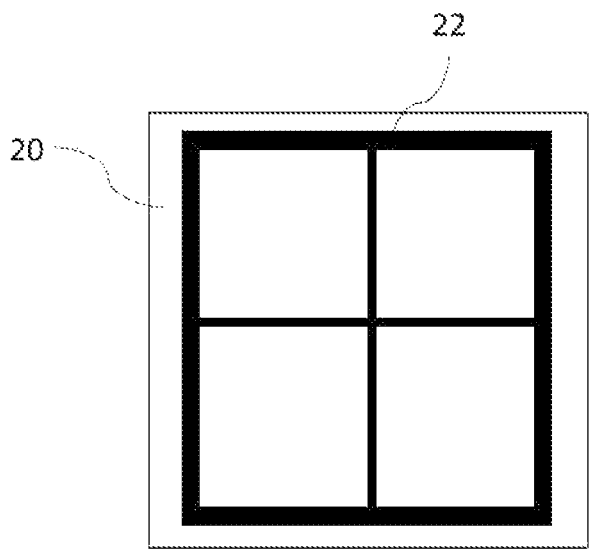
FIG. 11 is a diagram of one side of the partial transmission part in FIG. 10 facing an external part.

Further, the periodically changing pattern of the second metal conductor layer is the first metal grid, and the periodically changing pattern of the third metal conductor layer is a first metal block respectively arranged in each hollow position of the metal grid. Or, with reference to FIGS. 10 and 11, the periodically changing pattern of the third metal conductor layer is the first metal grid, and the periodically changing pattern of the second metal conductor layer is the first metal block respectively arranged in each hollow position of the first metal grid. However, the invention is not limited to this when actually implemented.

Figure 12:
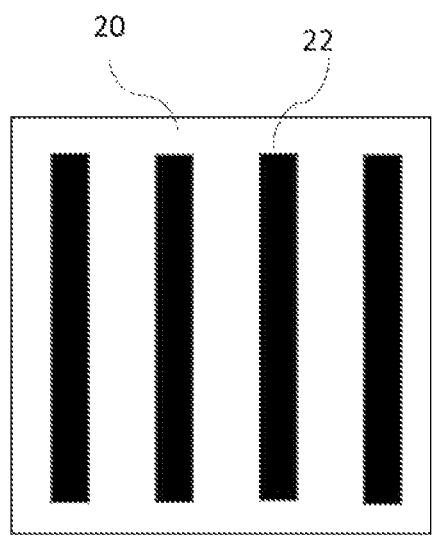
FIG. 12 is a diagram of another embodiment of a partial reflection part of the present invention facing one side of the total reflection part.
Figure 13:
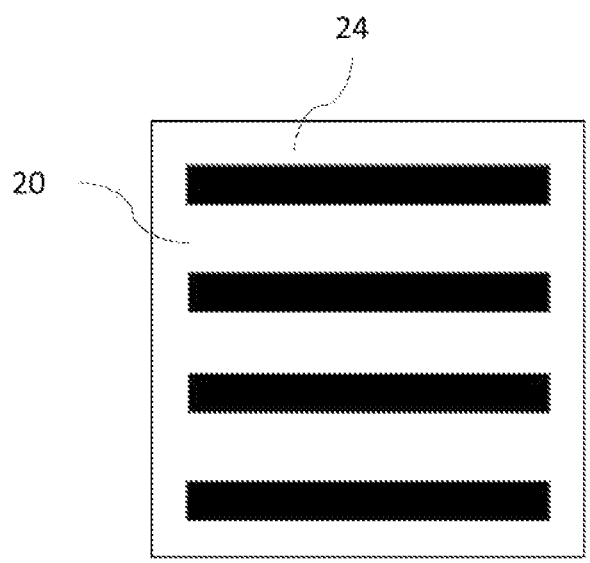
FIG. 13 is a diagram of one side of the partial reflection part in FIG. 12 facing the partial transmission part.
Figure 14:
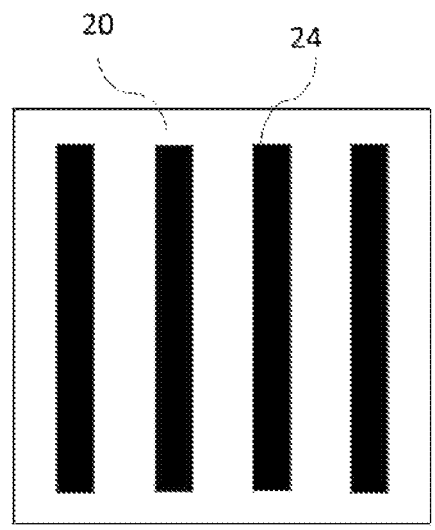
FIG. 14 is a diagram of still another embodiment of a partial reflection part of the present invention facing one side of the total reflection part.
Figure 15:
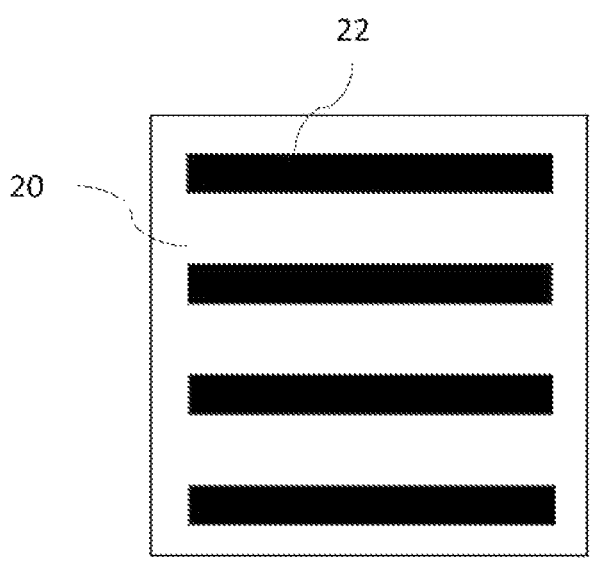
FIG. 15 is a diagram of one side of the partial reflection part in FIG. 14 facing the partial transmission part.

In some embodiments of the invention, with reference to FIGS. 12 and 13, the periodically changing pattern of the second metal conductor layer is a plurality of first metal stripes arranged vertically, and the periodically changing pattern of the third metal conductor layer is a plurality of second metal stripes arranged laterally; or, with reference to FIGS. 14 and 15, the periodically changing pattern of the second metal conductor layer is a plurality of first metal stripes arranged laterally, and the periodically changing pattern of the third metal conductor layer is a plurality of second metal stripes arranged vertically.

Figure 16:
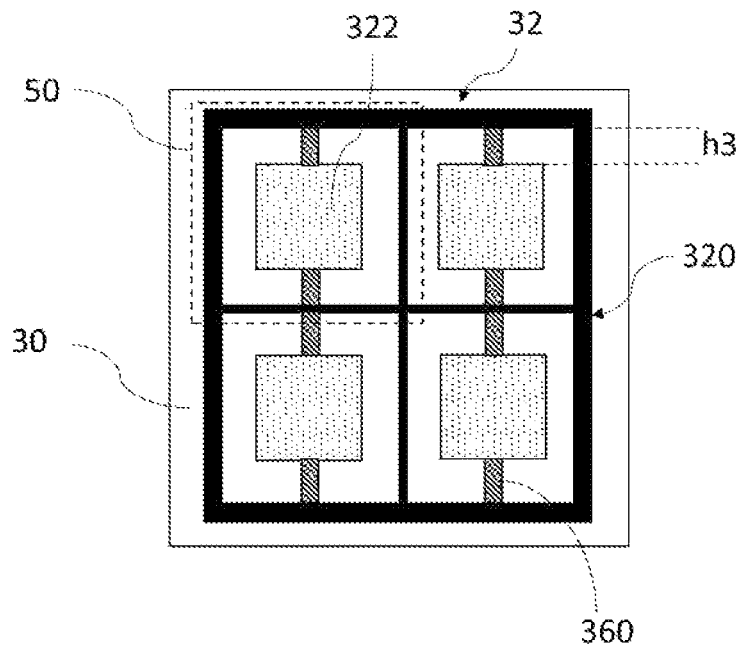
FIG. 16 is a diagram of one embodiment of a partial transmission part of the present invention facing one side of the partial reflection part.
Figure 17:
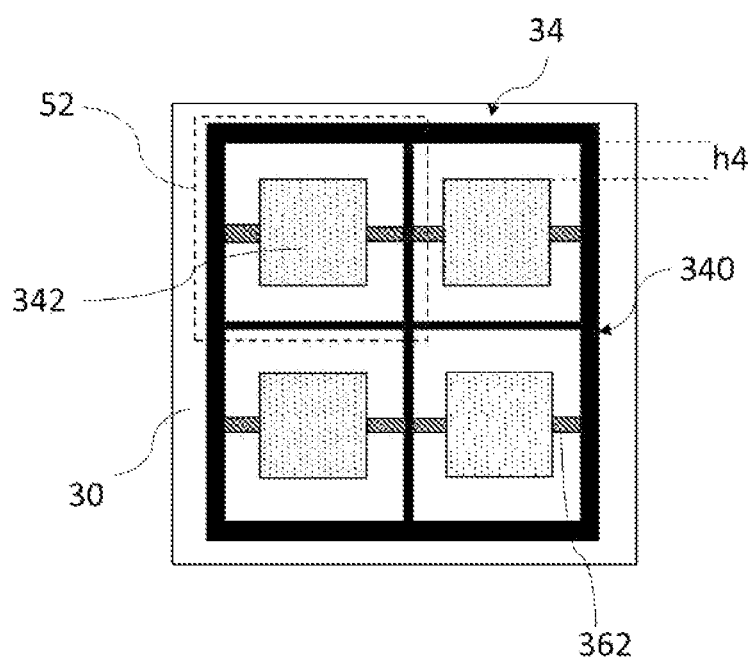
FIG. 17 is a diagram of one side of the partial transmission part in FIG. 16 facing away from the partial reflection part.

With reference to FIGS. 16 and 17, the partial transmission part 3 includes a third substrate 30, a fourth metastructure layer 32 and a fifth metastructure layer 34, wherein the third substrate 30 is arranged at a position facing the second substrate 20; the fourth metastructure layer 32 is arranged on one side of the third substrate 30 facing the second substrate 20; the fifth metastructure layer 34 is arranged on one side of the third substrate 30 facing away from the second substrate 20; the third substrate 30, the fourth metastructure layer 32, and the fifth metastructure layer 34 together form a second metainterface such that the electromagnetic wave of which the phase angle tends to be consistent passing through the third substrate 30, the fourth metastructure layer 32, and the fifth metastructure layer 34 realize to regulate the beam reconstruction condition with the same or different time delays.

In some embodiments of the invention, the fourth metastructure layer 32 is a fourth metal conductor layer, the fifth metastructure layer 34 is a fifth metal conductor layer, and the fourth metal conductor layer and the fifth metal conductor layer are in a periodically changing pattern; wherein a plurality of first adjusters of the fourth conductor metal layer and a plurality of second adjusters of the fifth conductor metal layer are adjusted to realize the beam reconstruction condition.

In some embodiments, with reference to FIGS. 16 and 17, the fourth metastructure layer 32 is the fourth metal conductor layer, and the fourth metal conductor layer includes the periodically changing pattern, as a second metal grid 320, and second metal blocks 322 respectively arranged in each hollow position of the second metal grid. Each of the second metal blocks 322 is separated from the second metal grid 320 surrounding thereto by a third distance h3, at least one of a plurality of first adjusters 360 are arranged between each of the second metal blocks 322 and the second metal grid 320 surrounding thereto respectively, and the at least one of the plurality of first adjusters 360 connected between each of the second metal blocks 322 and the second metal grid 320 surrounding thereto respectively forms a first reconstruction part 50.

Also, the fifth metal conductor layer includes the periodically changing pattern as a third metal grid 340, and third metal blocks 342 arranged in each hollow position of the third metal grid 340; the third metal block 342 is separated from the third metal grid 340 surrounding thereto by a fourth distance h4, at least one of a plurality of second adjusters 362 is respectively arranged between each of the third metal blocks 342 and the third metal grid 340 surrounding thereto, and the at least one of the plurality of second adjusters 362 connected between each of the third metal blocks 342 and the third metal grid 340 surrounding thereto respectively forms a second reconstruction part 52.

Figure 18:
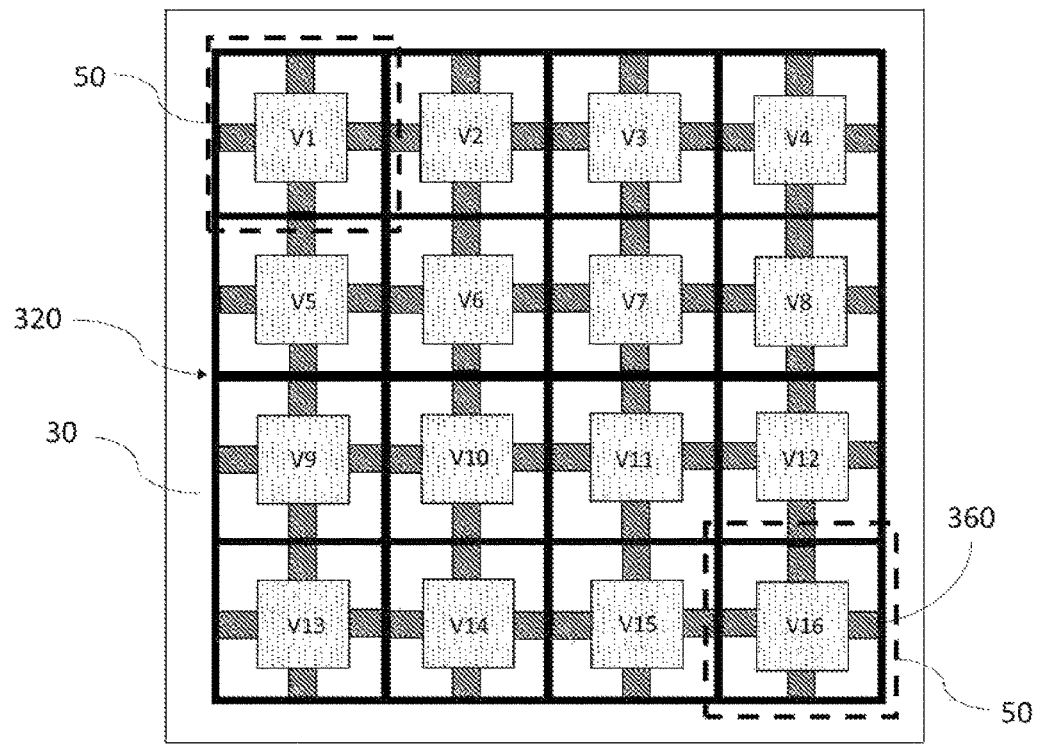
FIG. 18 is a diagram of one side of another partial transmission part of the present invention facing away from the partial reflection part.

In some embodiments of the invention, the first adjusters 360 and the second adjusters 362 may be variable capacitors or variable inductors. Furthermore, the first adjuster 360 and the second adjuster 362 are variable capacitors, and each of the variable capacitors may be independently biased; in other words, each of the first reconstruction part 50 and the second reconstruction part 52 may adjust the phase independently. What needs to be stated here is that each first reconstruction part 50 independently adjusts changes in phase through the first adjuster 360, and each second reconstruction part 52 independently adjusts changes in phase through the second adjuster 362, such that the partial transmission part 3 forms different phase layouts to realize a single-directional high-gain electromagnetic wave beam, or a multi-directional electromagnetic wave beam. For example, the variable capacitors of the first reconstruction part 50 from left to right and from top to bottom in FIG. 18 are given voltages V1-V16 respectively, so that the partial transmission part 3 forms different phase layouts.

Figure 19:
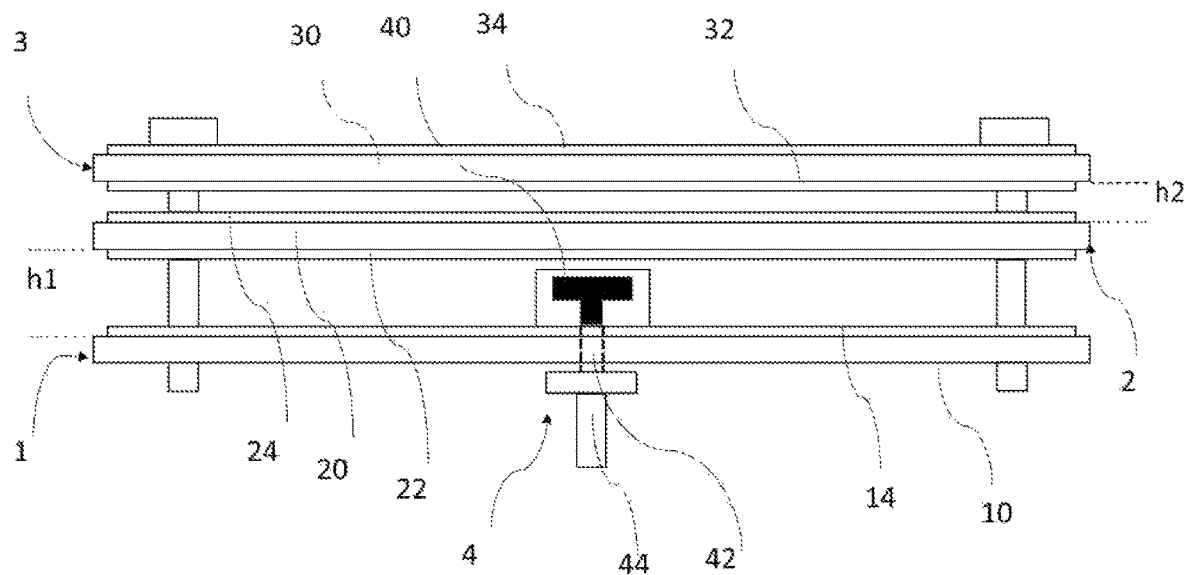
FIG. 19 is a diagram of an architecture according to another embodiment of the present invention.

In another embodiment, with reference to FIG. 19, the total reflection part 1 includes the first substrate 10 and the grounded metal surface 14, and the grounded metal surface 14 is arranged on one side facing the partial reflection part 2. The structure in the embodiment differs from that in FIGS. 1 to 3 and 6 in that the total reflection part 1 does not have the first metastructure layer 12, and the position of the first metastructure layer 12 in FIGS. 1 to 3 and 6 is changed to the grounded metal surface 14 in FIG. 19, with the structure of the remaining partial reflection parts 2 may be completely the same as the partial transmission part 3.

In summary, the electromagnetic waves radiated by the radiation part 4 first form constructive interference in the resonant cavity according to the resonance condition, so as to be adjusted into the electromagnetic wave of which the phase angle tends to be consistent, and then are shaped according to the beam reconstruction condition to radiate into space. Since the partial transmission part 3 may be adjusted the beam reconstruction condition, so that the electromagnetic wave of which the phase angle tends to be consistent under the same operating frequency may be aggregated to form a single beam in different directions under different beam reconstruction conditions, or may form multiple beams at the same time, wherein the direction of each beam of multiple beams may be different, which may solve the problem that the center frequency of the traditional antenna changes with the bias voltage and the beam direction may not be adjusted under a single operating frequency.

The above description is only to illustrate the preferred implementation mode of the invention, and is not intended to limit the scope of implementation. All simple replacements and equivalent changes made according to the patent scope of the invention and the content of the patent specification all belong to the scope of the patent application of the invention.

What is claimed is:

1. A reconfigurable antenna, comprising: a partial reflection part of which a reflection coefficient is greater than a transmission coefficient; a total reflection part arranged on one side of the partial reflection part, wherein a resonant cavity is formed between the partial reflection part and the total reflection part, and an electromagnetic wave is reflected back and forth in the resonant cavity, during the reflection of the electromagnetic wave back and forth in the resonant cavity and when the electromagnetic wave forms a constructive interference, a phase angle of the electromagnetic wave tends to be consistent for radiation to penetrate the partial reflection part; a partial transmission part of which a transmission coefficient is greater than a reflection coefficient, the partial transmission part being arranged on one side of the partial reflection part facing away from the total reflection part, wherein the electromagnetic wave of which the phase angle tends to be consistent is shaped to radiate into a space; and a radiation part arranged in the resonant cavity, the radiation part radiating the electromagnetic wave; wherein the total reflection part comprises: a first substrate; a first metastructure layer arranged on one side of the first substrate; and a grounded metal surface arranged on one side of the first substrate facing away from the first metastructure layer; wherein the partial reflection part comprises: a second substrate arranged at a position facing the first substrate; a second metastructure layer arranged on one side of the second substrate facing the first substrate; and a third metastructure layer arranged on one side of the second substrate facing away from the first substrate; wherein the second substrate, the second metastructure layer, and the third metastructure layer together form a first metainterface to realize a resonance condition; wherein the partial transmission part comprises: a third substrate arranged at a position facing the second substrate; a fourth metastructure layer arranged on one side of the third substrate facing the second substrate; and a fifth metastructure layer arranged on one side of the third substrate facing away from the second substrate; wherein the third substrate, the fourth metastructure layer, and the fifth metastructure layer together form a second metainterface such that the electromagnetic wave of which the phase angle tends to be consistent passing through the third substrate, the fourth metastructure layer, and the fifth metastructure layer realize to regulate a beam reconstruction condition with same or different time delays.

2. The reconfigurable antenna according to claim 1, wherein the first metastructure layer is a first metal conductor layer, and the first metal conductor layer is in a periodically changing pattern to totally reflect the electromagnetic wave.

3. The reconfigurable antenna according to claim 1, wherein the radiation part comprises: a radiator arranged between the first substrate and the partial reflection part; a feed-in transition structure arranged on the first substrate and connected with the radiator; and a feed-in element connector connected with the feed-in transition structure and the grounded metal surface, the feed-in element connector being configured to receiving receive a feed-in feeding source, such that the feed-in transition structure receives an energy of the feed-in feeding source via the feed-in element connector to radiate the electromagnetic wave from the radiator.

4. The reconfigurable antenna according to claim 1, wherein the second metastructure layer is a second metal conductor layer, the third metastructure layer is a third metal conductor layer, and the second metal conductor layer and the third metal conductor layer realize the resonance condition in a periodically changing pattern.

5. The reconfigurable antenna according to claim 4, wherein:
the periodically changing pattern of the second metal conductor layer is a first metal grid, and the periodically changing pattern of the third metal conductor layer is first metal blocks respectively arranged in each hollow position of the first metal grid; or
the periodically changing pattern of the third metal conductor layer is the first metal grid, and the periodically changing pattern of the second metal conductor layer is the first metal blocks respectively arranged in each hollow position of the first metal grid; or
the periodically changing pattern of the second metal conductor layer is a plurality of first metal stripes arranged vertically, and the periodically changing pattern of the third metal conductor layer is a plurality of second metal stripes arranged laterally; or
the periodically changing pattern of the second metal conductor layer is the plurality of first metal stripes arranged laterally, and the periodically changing pattern of the third metal conductor layer is the plurality of second metal stripes arranged vertically.

6. The reconfigurable antenna according to claim 1, wherein the fourth metastructure layer is a fourth metal conductor layer, the fifth metastructure layer is a fifth metal conductor layer, and the fourth metal conductor layer and the fifth metal conductor layer are in a periodically changing pattern; wherein a plurality of first adjusters of the fourth conductor metal layer and a plurality of second adjusters of the fifth conductor metal layer are adjusted to realize the beam reconstruction condition.

7. The reconfigurable antenna according to claim 6, wherein the fourth metastructure layer comprises the periodically changing pattern as a second metal grid and a plurality of second metal blocks, each of the second metal blocks being arranged in each hollow position of the second metal grid and separated from the second metal grid surrounding thereto by a third distance;
wherein at least one of the plurality of first adjusters is respectively arranged between each of the second metal blocks and the second metal grid surrounding thereto;
wherein each of the second metal blocks and the at least one of the plurality of first adjusters connected with the second metal grid surrounding thereto respectively forms a first reconfigurable part, and a position where each of the first reconfigurable parts passes through the third substrate and the fifth metal conductor layer corresponding thereto forms the same or different time delays, realizing the beam reconstruction condition.

8. The reconfigurable antenna according to claim 7, wherein the fifth metal conductor layer comprises the periodically changing pattern as a third metal grid and a plurality of third metal blocks, each of the third metal blocks being arranged in each hollow position of the third metal grid and separated from the third metal grid surrounding thereto by a fourth distance;
wherein at least one of the plurality of second adjusters is respectively arranged between each of the third metal blocks and the third metal grid surrounding thereto, and each of the third metal blocks and the at least one of the plurality of second adjusters connected with the third metal grid surrounding thereto respectively forms a second reconfigurable part.

9. The reconfigurable antenna according to claim 1, wherein the total reflection part comprises:
a first substrate; and
a grounded metal surface arranged on one side of the first substrate facing the partial reflection part.

10. The reconfigurable antenna according to claim 9, wherein the radiation part comprises:
a radiator arranged between the first substrate and the partial reflection part;
a transition structure arranged on the first substrate and connected with the radiator; and
a connector connected with the transition structure and the grounded metal surface, the connector being configured to receive a feeding source, such that the transition structure receives an energy of the feeding source via the connector to radiate the electromagnetic wave from the radiator.

11. The reconfigurable antenna according to claim 9, wherein the partial reflection part comprises:
a second substrate arranged at a position facing the first substrate;
a second metastructure layer arranged on one side of the second substrate facing the first substrate; and
a third metastructure layer arranged on one side of the second substrate facing away from the first substrate;
wherein the second substrate, the second metastructure layer, and the third metastructure layer together form a first metainterface to realize the resonance condition.

12. The reconfigurable antenna according to claim 11, wherein the second metastructure layer is a second metal conductor layer, the third metastructure layer is a third metal conductor layer, and the second metal conductor layer and the third metal conductor layer realize the resonance condition in a periodically changing pattern.

13. The reconfigurable antenna according to claim 12, wherein:
the periodically changing pattern of the second metal conductor layer is a first metal grid, and the periodically changing pattern of the third metal conductor layer is first metal blocks respectively arranged in each hollow position of the first metal grid; or
the periodically changing pattern of the third metal conductor layer is the first metal grid, and the periodically changing pattern of the second metal conductor layer is the first metal blocks respectively arranged in each hollow position of the first metal grid; or
the periodically changing pattern of the second metal conductor layer is a plurality of first metal stripes arranged vertically, and the periodically changing pattern of the third metal conductor layer is a plurality of second metal stripes arranged laterally; or
the periodically changing pattern of the second metal conductor layer is the plurality of first metal stripes arranged laterally, and the periodically changing pattern of the third metal conductor layer is the plurality of second metal stripes arranged vertically.

14. The reconfigurable antenna according to claim 11, wherein the partial transmission part comprises:
a third substrate arranged at a position facing the second substrate;
a fourth metastructure layer arranged on one side of the third substrate facing the second substrate; and
a fifth metastructure layer arranged on one side of the third substrate facing away from the second substrate;
wherein the third substrate, the fourth metastructure layer, and the fifth metastructure layer together form a second metainterface such that the electromagnetic wave of which the phase angle tends to be consistent passing through the third substrate, the fourth metastructure layer, and the fifth metastructure layer realize to regulate the beam reconstruction condition with the same or different time delays.

15. The reconfigurable antenna according to claim 14, wherein the fourth metastructure layer is a fourth metal conductor layer, the fifth metastructure layer is a fifth metal conductor layer, and the fourth metal conductor layer and the fifth metal conductor layer are in a periodically changing pattern; wherein a plurality of first adjusters of the fourth conductor metal layer and a plurality of second adjusters of the fifth conductor metal layer are adjusted to realize the beam reconstruction condition.

16. The reconfigurable antenna according to claim 15, wherein the fourth metastructure layer comprises the periodically changing pattern as a second metal grid and a plurality of second metal blocks, each of the second metal blocks being arranged in each hollow position of the second metal grid and separated from the second metal grid surrounding thereto by a third distance;
wherein at least one of the plurality of first adjusters is respectively arranged between each of the second metal blocks and the second metal grid surrounding thereto;
wherein each of the second metal blocks and the at least one of the plurality of first adjusters connected with the second metal grid surrounding thereto respectively forms a first reconfigurable part, and a position where each of the first reconfigurable parts passes through the third substrate and the fifth metal conductor layer corresponding thereto forms the same or different time delays, realizing the beam reconstruction condition.

17. The reconfigurable antenna according to claim 16, wherein the fifth metal conductor layer comprises the periodically changing pattern as a third metal grid and a plurality of third metal blocks, each of the third metal blocks being arranged in each hollow position of the third metal grid and separated from the third metal grid surrounding thereto by a fourth distance;
wherein at least one of the plurality of second adjusters is respectively arranged between each of the third metal blocks and the third metal grid surrounding thereto, and each of the third metal blocks and the at least one of the plurality of second adjusters connected with the third metal grid surrounding thereto respectively forms a second reconfigurable part.

* * * * *